United States Patent
Marri et al.

(10) Patent No.: US 12,249,116 B2
(45) Date of Patent: Mar. 11, 2025

(54) CONCEPT DISAMBIGUATION USING MULTIMODAL EMBEDDINGS

(71) Applicant: ADOBE INC., San Jose, CA (US)

(72) Inventors: Venkata Naveen Kumar Yadav Marri, Fremont, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 385 days.

(21) Appl. No.: 17/656,147

(22) Filed: Mar. 23, 2022

(65) Prior Publication Data

US 2023/0326178 A1  Oct. 12, 2023

(51) Int. Cl.
  *G06V 10/771* (2022.01)
  *G06N 3/088* (2023.01)
  *G06V 10/74* (2022.01)
  *G06V 10/77* (2022.01)
  *G06V 10/774* (2022.01)
  *G06V 10/82* (2022.01)

(52) U.S. Cl.
  CPC .......... *G06V 10/761* (2022.01); *G06N 3/088* (2013.01); *G06V 10/771* (2022.01); *G06V 10/7715* (2022.01); *G06V 10/774* (2022.01); *G06V 10/82* (2022.01)

(58) Field of Classification Search
  CPC .............. G06V 10/761; G06V 10/771; G06V 10/7715; G06V 10/774; G06V 10/82; G06V 20/70; G06N 3/088; G06N 3/0464; G06N 3/09
  See application file for complete search history.

(56) References Cited

U.S. PATENT DOCUMENTS

| | | | |
|---|---|---|---|
| 9,830,526 B1 | 11/2017 | Lin et al. | |
| 2016/0259862 A1* | 9/2016 | Navanageri | G06F 16/955 |
| 2018/0204111 A1* | 7/2018 | Zadeh | G06V 10/764 |
| 2018/0232443 A1* | 8/2018 | Delgo | G06F 16/35 |
| 2019/0327331 A1* | 10/2019 | Natarajan | G06F 40/274 |
| 2020/0379787 A1* | 12/2020 | Martin | G06N 3/006 |
| 2021/0067684 A1* | 3/2021 | Kim | G06N 20/00 |
| 2021/0365727 A1 | 11/2021 | Aggarwal et al. | |

OTHER PUBLICATIONS

Aggarwal, et al., Towards Zero-shot Cross-lingual Image retrieval. arXiv preprint arXiv:2012.05107v1 [cs.CL] Nov. 24, 2020, 7 pages.

* cited by examiner

*Primary Examiner* — Chan S Park
*Assistant Examiner* — D J Dhooge
(74) *Attorney, Agent, or Firm* — F. CHAU & ASSOCIATES, LLC

(57) ABSTRACT

Systems and methods for image processing are described. Embodiments of the present disclosure identify a plurality of candidate concepts in a knowledge graph (KG) that correspond to an image tag of an image; generate an image embedding of the image using a multi-modal encoder; generate a concept embedding for each of the plurality of candidate concepts using the multi-modal encoder; select a matching concept from the plurality of candidate concepts based on the image embedding and the concept embedding; and generate association data between the image and the matching concept.

20 Claims, 10 Drawing Sheets

CONCEPT DISAMBIGUATION USING MULTIMODAL EMBEDDINGS

BACKGROUND

The following relates generally to digital image processing, and more specifically to concept disambiguation using machine learning.

Digital image processing refers to the use of a computer to edit a digital image or analyze an image using an algorithm or a processing network. Image tagging is a subfield of image processing. An image tagger produces one or more text tags based on an image. The tags can then be used for retrieving similar images or for image classification. In some examples, an image depicting turkey the bird may be associated with tags such as turkey, tom, gobbler, or a combination thereof. However, an image tag may be ambiguous and can lead to confusion. For example, the tag "turkey" could refer to turkey the bird or Turkey the country.

Conventional image tagging systems are not able to efficiently identify a correct concept description based on an ambiguous image tag or caption. As a result, users and can be confused and applications can misuse or miscategorized images. Therefore, there is a need in the art for an improved image processing system that can efficiently and accurately perform concept disambiguation for images.

SUMMARY

The present disclosure describes systems and methods for image processing. Embodiments of the present disclosure include an image processing apparatus configured to select a matching concept from a knowledge graph based on a query image when an image tag associated with the query image is ambiguous. In some examples, the image processing apparatus matches images to nodes of a knowledge graph (KG) when two nodes match a same image tag (e.g., when attempting to match a picture of a turkey, the bird, to either the node in the knowledge graph representing the bird or the country). A multi-modal encoder of the image processing apparatus is configured to encode the query image and a concept description of the node to obtain an image embedding and a concept embedding, respectively. The image processing apparatus computes a similarity score between the image embedding and each of the concept embeddings and determines a matching concept based on comparing the similarity scores.

A sequential encoder is used to determine different pieces of information sequentially, e.g., classification of the new object, x coordinate, y coordinate, height, and width. This enables the inserted object to be placed and scaled appropriately within the image. In some embodiments, a sequence generation component of the image generation apparatus generates a sequence of tokens including a set of tokens corresponding to an existing object and a set of mask tokens corresponding to the new object to be inserted into the image. A sequence encoder of the image generation apparatus generates a placement token value for the set of mask tokens based on the sequence of tokens. The placement token value represents position information of the new object (e.g., coordinates, location, scale). The image generation apparatus inserts the new object into the image based on the position information to obtain a composite image.

A method, apparatus, and non-transitory computer readable medium for image processing are described. One or more embodiments of the method, apparatus, and non-transitory computer readable medium include identifying a plurality of candidate concepts in a knowledge graph (KG) that correspond to an image tag of an image; generating an image embedding of the image using a multi-modal encoder; generating a concept embedding for each of the plurality of candidate concepts using the multi-modal encoder; selecting a matching concept from the plurality of candidate concepts based on the image embedding and the concept embedding; and generating association data between the image and the matching concept.

A method, apparatus, and non-transitory computer readable medium for image processing are described. One or more embodiments of the method, apparatus, and non-transitory computer readable medium include identifying a plurality of candidate concepts in a knowledge graph (KG) that correspond to an image tag of an image; generating an image embedding of the image using a multi-modal encoder; generating a concept embedding for each of the plurality of candidate concepts using the multi-modal encoder; computing a similarity score between the image embedding and the concept embedding; comparing the similarity score for each of the plurality of candidate concepts; and selecting a matching concept from the plurality of candidate concepts based on the comparison.

An apparatus and method for image processing are described. One or more embodiments of the apparatus and method include a knowledge graph (KG) component configured to identify a plurality of candidate concepts in a KG that correspond to an image tag of an image; a multi-modal encoder configured to generate an image embedding of the image and to generate a concept embedding for each of the plurality of candidate concepts; and a matching component configured to select a matching concept from the plurality of candidate concepts based on the image embedding and the concept embedding.

DETAILED DESCRIPTION

Figure 1:
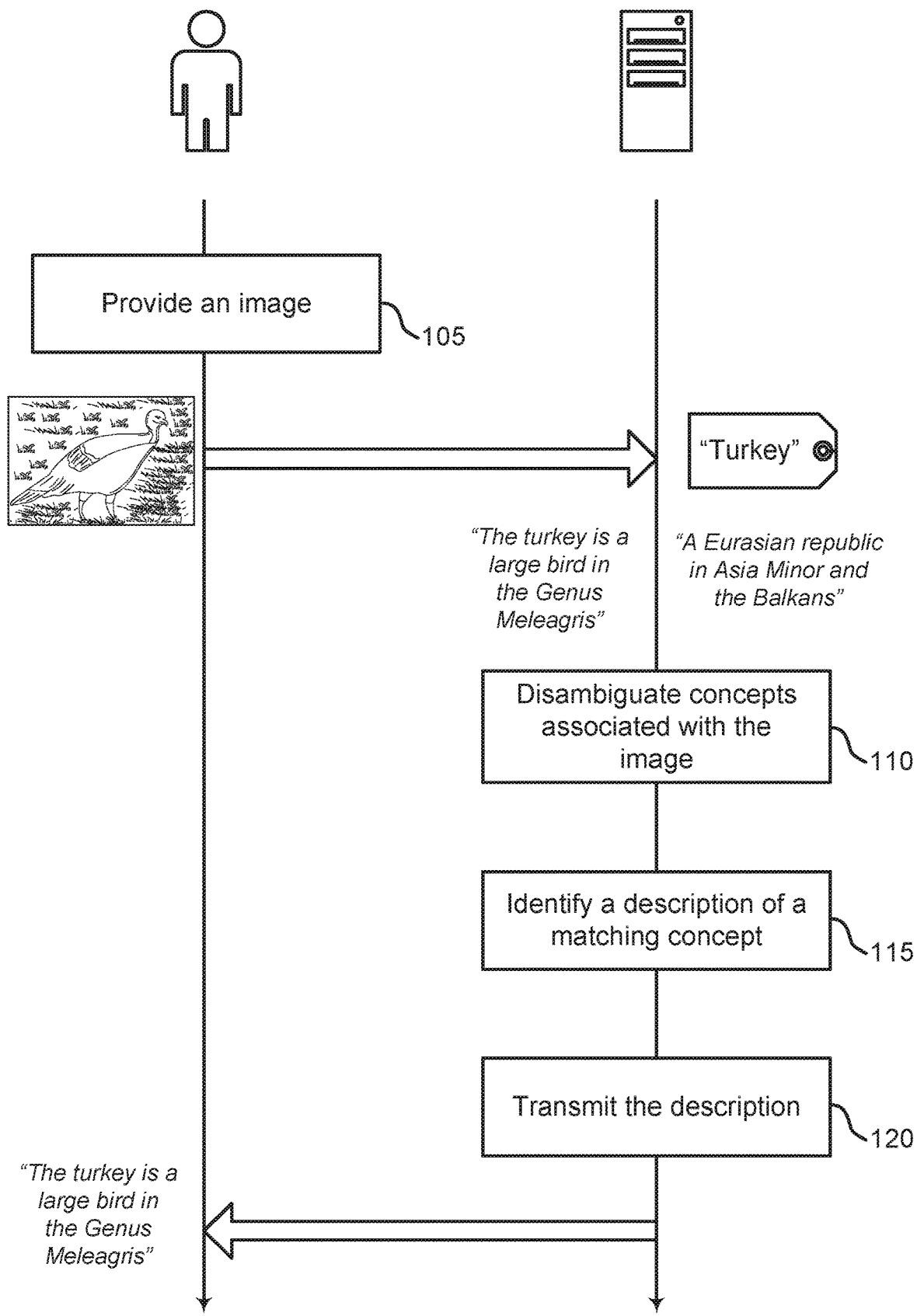
FIG. 1 shows an example of question answering application according to aspects of the present disclosure.

The present disclosure describes systems and methods for image processing. Embodiments of the present disclosure include an image processing apparatus configured to select a matching concept from a knowledge graph (KG) based on a query image when an image tag associated with the query image is ambiguous. In some examples, the image processing apparatus matches images to nodes of a knowledge graph when two nodes match a same image tag (e.g., when attempting to match a picture of a turkey, the bird, to either the node in the knowledge graph representing the bird or the country). A multi-modal encoder of the image processing apparatus is configured to encode the query image and a concept description of the node to obtain an image embedding and a concept embedding, respectively. The image processing apparatus computes a similarity score between the image embedding and each of the concept embeddings and determines a matching concept based on comparing the similarity scores. In some examples, the multi-modal encoder is trained, via contrastive learning techniques, to support a single unified text-and-digital image embedding space that treats text and digital images as the same entity (e.g., common embedding space).

Conventional image tagging systems produce image tags given a digital image. However, image tags produced by these systems may be ambiguous. That is, they may not specify a definition that the image tag refers to. For example, if an image of a turkey (i.e., the bird) is tagged using conventional image tagging systems, the tag "turkey" produced by these systems is ambiguous because turkey can mean turkey the bird or Turkey the country.

Embodiments of the present disclosure include an image processing apparatus that matches images to nodes of a knowledge graph when two nodes match one image tag (i.e., an image tag is ambiguous and can be associated with two or more nodes in the knowledge graph). In some examples, nodes in the knowledge graph are also referred to as concepts. Each node/concept is associated with a corresponding concept description and a corresponding concept id. A multi-modal encoder is configured to encode digital images and text in a common shared embedding space. In some examples, a query image depicts a turkey (the bird). An image tag ("turkey") may correspond to two concepts/nodes in the knowledge graph. The first concept has a description of a Eurasian republic while the second concept has a description of a large bird native to North America.

By encoding images and text in a common shared embedding space, embodiments of the present disclosure calculate a similarity score between the query image and each of the concept descriptions found in the knowledge graph. In some examples, a multi-modal encoder encodes the query image to obtain an image embedding. The multi-modal encoder encodes each of concept descriptions to obtain a concept embedding (i.e., text embedding) for each retrieved concept in the knowledge graph. The image processing apparatus compares the image and text embedding in the same embedding space and locates a nearest neighbor by comparing similarity metrics. The located nearest neighbor is a matching concept for the image tag based on the query image. In the above example, the second concept embedding corresponding to a description of a large bird native to North America is closest to the image embedding of the query image. Hence, the image processing apparatus selects the second concept as a matching concept.

In some embodiments, the image processing apparatus extracts similar images and image tags before performing concept disambiguation. The image processing apparatus extracts similar images based on the query image and tags associated with these similar images. These similar images are among the closest images to the query image (e.g., search for top-k candidate visual embeddings in the database) using approximate nearest neighbor methods. The image processing apparatus then extracts image tags for each of the retrieved candidate images. The image processing apparatus computes aggregate similarity score for each of the image tags to obtain a confidence score associated with each image. Users can filter the image tags based on confidence scores to obtain the top tags.

Next, the image processing apparatus searches in the knowledge graph to locate concepts/nodes based on an image tag from the top tags mentioned above. The image processing apparatus extracts multi-modal visual embedding from the query image and multi-modal text embedding for each of the candidate concept descriptions. The image processing apparatus determines the closest concept description based on computing a similarity score between the visual embedding and each of the candidate concept embeddings.

Accordingly, the image processing apparatus can efficiently and accurately perform concept disambiguation by identifying a matching concept (concept description) from candidate concepts/nodes in a knowledge graph with regards to an image. User satisfaction is increased because users can easily associate the query image with a correct concept description from the knowledge graph when an image tag of the query image points to two or more nodes in the knowledge graph.

Embodiments of the present disclosure may be used in the context of image processing applications. For example, an image processing network based on the present disclosure can select a matching concept from two or more candidate concepts in a knowledge graph based on a query image that is associated with an ambiguous image tag or caption. An example application of the inventive concept in the image processing context is provided with reference to FIGS. 1-2. Details regarding the architecture of an example image processing apparatus are provided with reference to FIGS. 6-9. Example processes for image processing are provided with reference to FIGS. 3-5. Example training processes are described with reference to FIG. 10.

Image Processing

In FIGS. 1-5, a method, apparatus, and non-transitory computer readable medium for image processing are described. One or more embodiments of the method, apparatus, and non-transitory computer readable medium include identifying a plurality of candidate concepts in a knowledge graph (KG) that correspond to an image tag of an image; generating an image embedding of the image using a multi-modal encoder; generating a concept embedding for each of the plurality of candidate concepts using the multi-modal encoder; selecting a matching concept from the plurality of candidate concepts based on the image embedding and the concept embedding; and generating association data between the image and the matching concept.

Some examples of the method, apparatus, and non-transitory computer readable medium further include extracting a plurality of image tags based on the image using an image tagger, wherein the plurality of image tags comprises the image tag.

Some examples of the method, apparatus, and non-transitory computer readable medium further include identifying a plurality of similar images based on the image embedding. Some examples further include identifying a plurality of additional image tags associated with the plurality of similar images. Some examples further include computing a tag similarity score for each of the plurality of additional image tags, wherein the image tag is selected based on the tag similarity score.

Some examples of the method, apparatus, and non-transitory computer readable medium further include identifying a description for each of the plurality of candidate concepts, wherein the concept embedding is based on the description.

Some examples of the method, apparatus, and non-transitory computer readable medium further include identifying a name for each of the plurality of candidate concepts in the KG. Some examples further include determining that the name corresponds to the image tag.

Some examples of the method, apparatus, and non-transitory computer readable medium further include computing a similarity score between the image embedding and the concept embedding. Some examples further include comparing the similarity score for each of the plurality of candidate concepts, wherein the matching concept is selected based on the comparison.

Some examples of the method, apparatus, and non-transitory computer readable medium further include identifying a plurality of images. Some examples further include associating each of the plurality of images with a concept in the KG. Some examples further include augmenting the KG with the plurality of images based on the association.

Some examples of the method, apparatus, and non-transitory computer readable medium further include receiving a query including the image. Some examples further include identifying a description of the matching concept. Some examples further include transmitting the description in response to the query.

Some examples of the method, apparatus, and non-transitory computer readable medium further include receiving a plurality of training images and a plurality of captions corresponding to each of the plurality of training images as input to the multi-modal encoder. Some examples further include training the multi-modal encoder based on the input using contrastive self-supervised learning.

Some examples of the method, apparatus, and non-transitory computer readable medium further include maximizing a similarity between an anchor image of the plurality of training images and a corresponding caption of the anchor image. Some examples further include minimizing a similarity between the anchor image of the plurality of training images and the plurality of captions excluding the corresponding caption. Some examples further include updating parameters of the multi-modal encoder based on the maximization and the minimization.

A method, apparatus, and non-transitory computer readable medium for image processing are described. One or more embodiments of the method, apparatus, and non-transitory computer readable medium include identifying a plurality of candidate concepts in a knowledge graph (KG) that correspond to an image tag of an image; generating an image embedding of the image using a multi-modal encoder; generating a concept embedding for each of the plurality of candidate concepts using the multi-modal encoder; computing a similarity score between the image embedding and the concept embedding; comparing the similarity score for each of the plurality of candidate concepts; and selecting a matching concept from the plurality of candidate concepts based on the comparison.

Some examples of the method, apparatus, and non-transitory computer readable medium further include extracting a plurality of image tags based on the image using an image tagger, wherein the plurality of image tags comprises the image tag.

Some examples of the method, apparatus, and non-transitory computer readable medium further include identifying a description for each of the plurality of candidate concepts, wherein the concept embedding is based on the description.

Some examples of the method, apparatus, and non-transitory computer readable medium further include identifying a name for each of the plurality of candidate concepts in the KG. Some examples further include determining that the name corresponds to the image tag.

FIG. 1 shows an example of question answering application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 105, the user provides an image. In some cases, the operations of this step refer to, or may be performed by, a user through a user device as described with reference to FIG. 6. For example, the user provides an image depicting a turkey (i.e., the bird). Image tag "turkey" may be generated by an image tagger. Tag "turkey" is associated with the image. However, turkey is an ambiguous phrase. It is not clear whether the tag "turkey" refers to turkey the bird or Turkey the country just by reading the image tag.

At operation 110, the system disambiguates concepts associated with the image. In some cases, the operations of this step refer to, or may be performed by, an image processing apparatus as described with reference to FIGS. 6 and 7. In some examples, the system maps the image tag to candidate concepts in a knowledge graph. Each concept in the knowledge graph includes or is associated with a concept description explaining the concept. In the above example, the system extracts at least two concept descriptions based on the image tag "turkey". They are "A Eurasian republic in Asian Minor and the Balkans" and "The turkey is a large bird in the Genus *Meleagris*, native to North America".

At operation 115, the system identifies a description of a matching concept. In some cases, the operations of this step refer to, or may be performed by, an image processing apparatus as described with reference to FIGS. 6 and 7. In the above example, the system identifies a matching concept to be "The turkey is a large bird in the Genus *Meleagris*, native to North America" because the image depicts turkey the bird, not the country.

At operation 120, the system transmits the description. In some cases, the operations of this step refer to, or may be performed by, an image processing apparatus as described with reference to FIGS. 6 and 7. The system transmits concept description "The turkey is a large bird in the Genus *Meleagris*, native to North America" to the user. In some examples, the user can provide another image depicting a man wearing a coat in a snowy day to the system. The system may generate an image tag "cold" via an image tagger. However, the phrase "cold" may be ambiguous because "cold" can refer to the condition or subjective perception of temperature or it can also refer to contagious respiratory illnesses caused by certain viruses.

Figure 2:
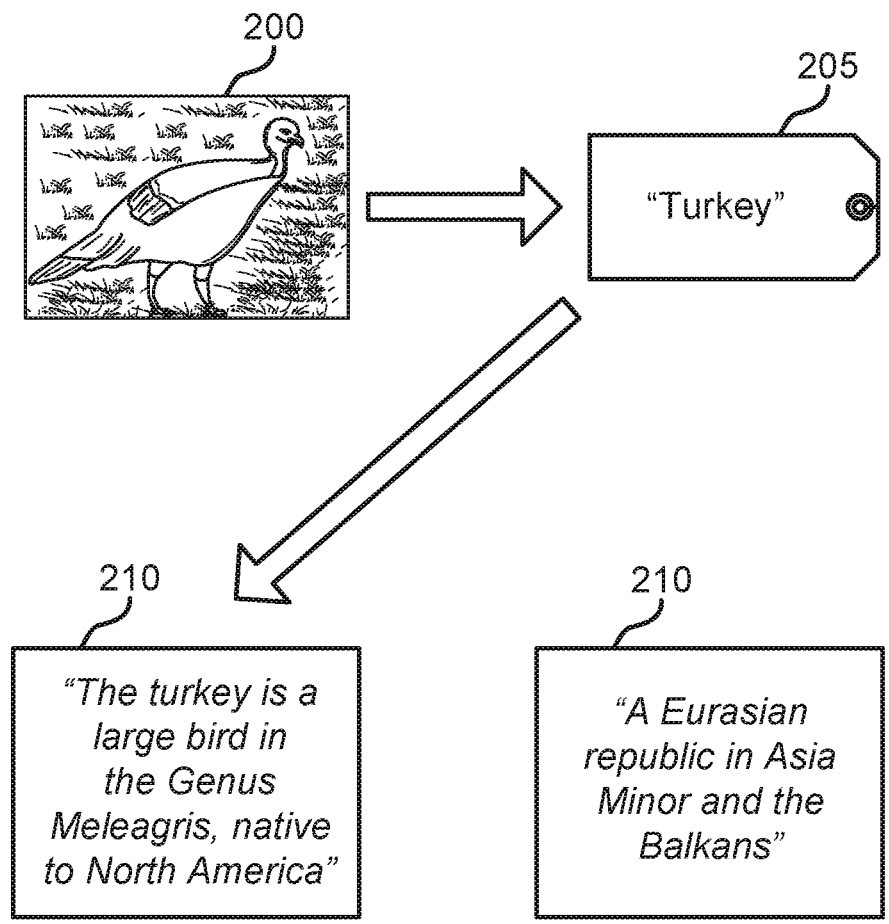
FIG. 2 shows an example of image tags and concept description according to aspects of the present disclosure.

FIG. 2 shows an example of image tags and concept description according to aspects of the present disclosure. The example shown includes image 200, image tag 205, and concept description 210. According to an embodiment, image tagger produces image tags based on image 200. However, tags produced may be ambiguous. For example, image 200 depicts turkey (i.e., the bird) and image tag "turkey" is associated with image 200. The image tag "turkey" is ambiguous because turkey can mean turkey the bird or Turkey the country.

According to an embodiment of the present disclosure, an image processing apparatus (see FIG. 7) can disambiguate two different concepts indicated by a same image tag. That is, the image processing apparatus can determine whether the image tag refers to turkey the bird or Turkey the country based on the image. The image processing apparatus can transmit an appropriate concept description 210 based on image 200 and image tag 205. In the above example, the image processing apparatus searches for candidate concepts in a knowledge graph based on image tag 205 "turkey". Candidate concept descriptions are "A Eurasian republic in Asian Minor and the Balkans" and "The turkey is a large bird in the Genus *Meleagris*, native to North America". The image processing apparatus selects a matching concept and transmits concept description "The turkey is a large bird in the Genus *Meleagris*, native to North America" to a user. This is identified as the appropriate concept because image 200 depicts turkey the bird, in this example.

Image 200 is an example of, or includes aspects of, the corresponding element described with reference to FIG. 8. Image tag 205 is an example of, or includes aspects of, the corresponding element described with reference to FIG. 8. Concept description 210 is an example of, or includes aspects of, the corresponding element described with reference to FIG. 8.

Figure 3:
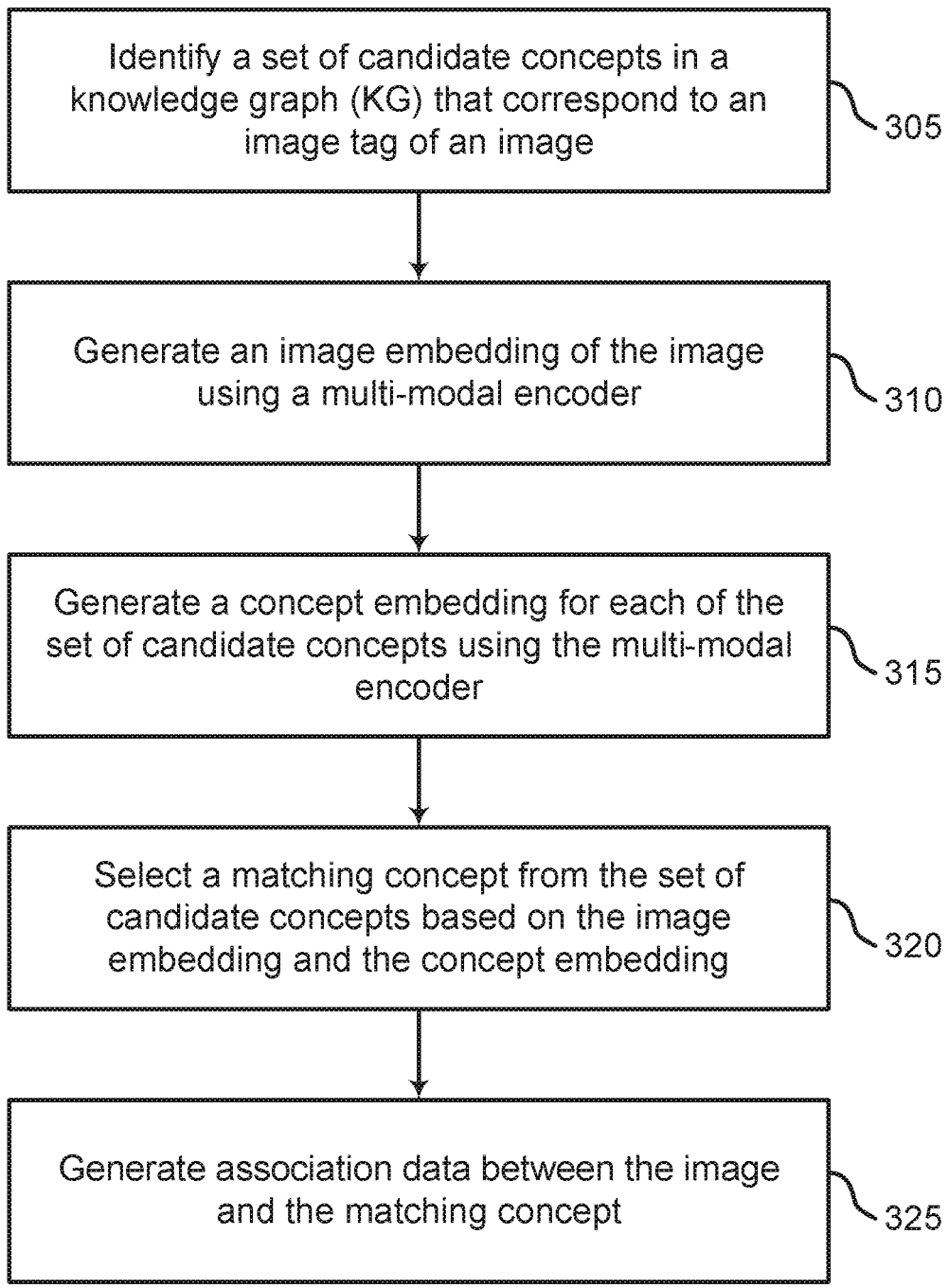
FIG. 3 shows an example of a method for selecting a matching concept from a set of candidate concepts according to aspects of the present disclosure.

FIG. 3 shows an example of a method for selecting a matching concept from a set of candidate concepts according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the system identifies a set of candidate concepts in a knowledge graph (KG) that correspond to an image tag of an image. In some cases, the operations of this step refer to, or may be performed by, a knowledge graph component as described with reference to FIGS. 7-9. Extracting an image tag based on an image will be described in greater detail in FIG. 4. The present disclosure relates to matching images to nodes of a knowledge base when two nodes match an image tag. For example, a picture of a turkey, the bird, can be matched to either a node representing the bird or another node representing the country.

At operation 310, the system generates an image embedding of the image using a multi-modal encoder. In some cases, the operations of this step refer to, or may be performed by, a multi-modal encoder as described with reference to FIGS. 7-9. According to an embodiment, a multi-modal encoder encodes the image and a concept description of the node. The image embedding and the concept embedding are in a same embedding space. The system identifies a matching concept based on calculating a similarity score between the image embedding and the concept embedding. Training the multi-modal encoder, via a training component, will be described in FIGS. 7 and 10.

At operation 315, the system generates a concept embedding for each of the set of candidate concepts using the multi-modal encoder. In some cases, the operations of this step refer to, or may be performed by, a multi-modal encoder as described with reference to FIGS. 7-9. In some examples, two or more nodes are extracted from a knowledge graph based on the image tag. Each of the nodes includes a concept description. For tag "turkey", at least two concepts/nodes are identified from the knowledge graph. A first concept has description "A Eurasian republic in Asian Minor and the Balkans" and a second concept has description "The turkey is a large bird in the Genus *Meleagris*, native to North America". The first concept description and the second concept description are input to multi-modal encoder to generate a concept embedding for each of two candidate concepts.

At operation 320, the system selects a matching concept from the set of candidate concepts based on the image embedding and the concept embedding. Selecting a matching concept will be described in greater detail in FIG. 5. In some cases, the operations of this step refer to, or may be performed by, a matching component as described with reference to FIGS. 7 and 9. In an embodiment, the matching component computes a similarity score between the image embedding and the concept embedding, compares the similarity score for each of the set of candidate concepts, and selects a matching concept from the set of candidate concepts based on the comparison.

At operation 325, the system generates association data between the image and the matching concept. In some cases, the operations of this step refer to, or may be performed by, an association manager as described with reference to FIGS. 7 and 9.

Figure 4:
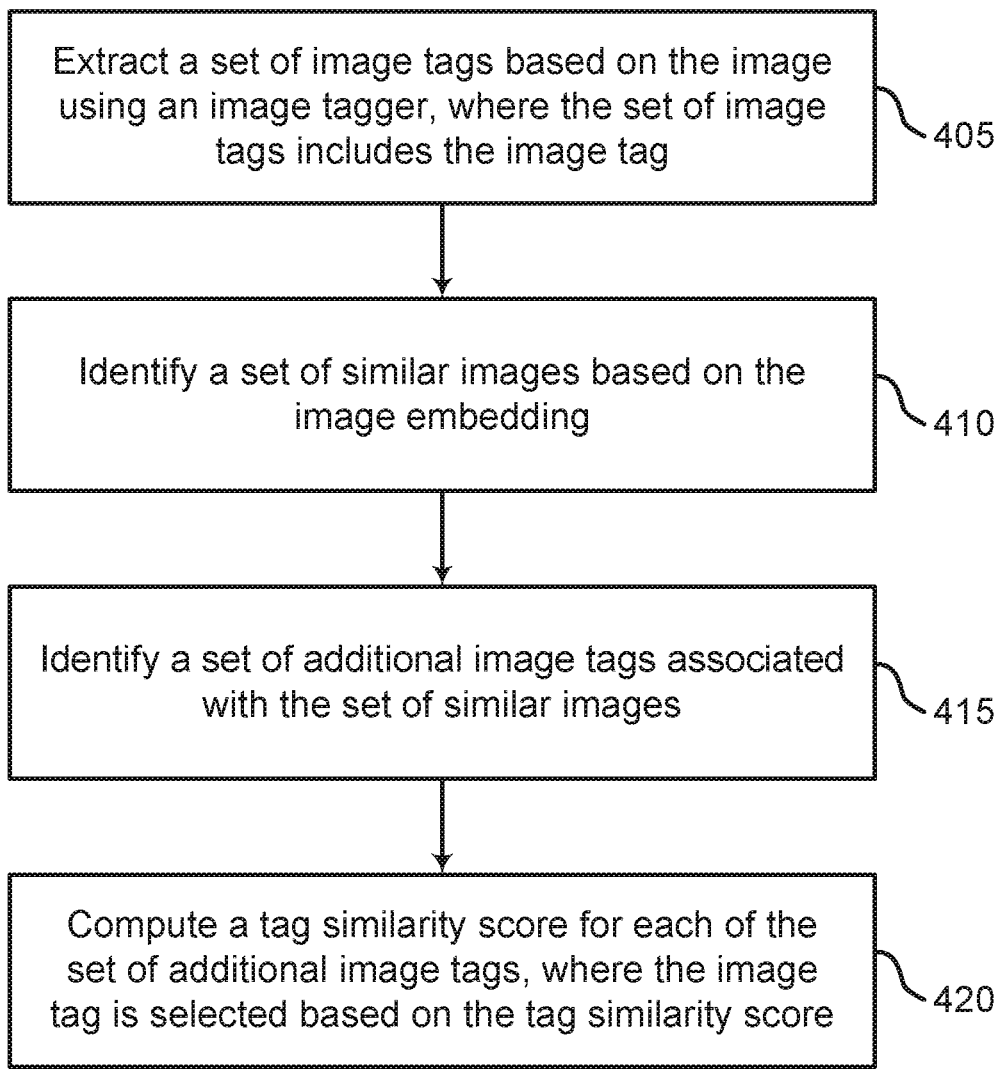
FIG. 4 shows an example of a method for selecting an image tag according to aspects of the present disclosure.

FIG. 4 shows an example of a method for selecting an image tag according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system extracts a set of image tags based on the image using an image tagger, where the set of image tags includes the image tag. In some cases, the operations of this step refer to, or may be performed by, an image tagger as described with reference to FIGS. 7-9.

At operation 410, the system identifies a set of similar images based on the image embedding. In some cases, the operations of this step refer to, or may be performed by, an image tagger as described with reference to FIGS. 7-9.

According to an embodiment, the image processing apparatus extracts image embeddings for a predetermined set of images. For example, the image embeddings can be a list of floating-point values. The extracted image features are indexed into datastores that can perform nearest neighbor computation. In some cases, the engines are supported by GPUs to have significant increase in performance. Each image indexed in the datastore includes a set of associated image tags and a relevancy score. In some examples, image id and corresponding image tags with the corresponding relevancy scores are stored in a dictionary.

The image processing apparatus extracts image embeddings from an input image using a deep neural network. The input image may also be referred to as a query image. In some cases, the image processing apparatus performs a nearest neighbor search using the precomputed image embeddings datastore to extract closest or similar images. In some examples, the images extracted are similar to the query image.

At operation 415, the system identifies a set of additional image tags associated with the set of similar images. In some cases, the operations of this step refer to, or may be performed by, an image tagger as described with reference to FIGS. 7-9. In some examples, each extracted image (i.e., each image from the set of similar images) has a set of image tags associated with them. The image processing apparatus aggregates image tags weighted by the similarity score between the query image and the extracted image from the index or database. The image processing apparatus picks top n image tags.

At operation 420, the system computes a tag similarity score for each of the set of additional image tags, where the image tag is selected based on the tag similarity score. In some cases, the operations of this step refer to, or may be performed by, an image tagger as described with reference to FIGS. 7-9.

In some cases, visual embeddings ($V_q$) are computed for a query image using a deep neural network. Visual embeddings extracted from the query image are used to query the database to compute similarity of query visual embedding to the set of candidate visual embeddings in the database. The operation sim(•) is a similarity metric such as L2 norm or cosine similarity. n is the number of candidates in the database. The operation sim(•) is formulated as follows:

$$d_v = \text{sim}(V_q, V_i)_{i=1}^n \qquad (1)$$

Top k similar candidates can be obtained using the sim(•) operation, where k is the number of similar images that are considered by the image tagger.

In some cases, corresponding tags for each of the candidate images (retrieved using visual similarity) are extracted using the dictionary. Each tag has a relevancy score ($rel_{ij}$) where i and j are the corresponding image and tag respectively. The relevancy score specifies how important the tag is given the image.

For each of the retrieved image and tag pair, the image processing apparatus computes an aggregate similarity score ($Tag_j$) for each of the image tags as follows:

$$\text{Tag}_i = \frac{\sum_i^n rel_{ij} * d_i}{\sum_i^n rel_{ij}} \qquad (2)$$

Based on the aggregate similarity score $Tag_j$ computed for each of the image tags, the image processing apparatus then filters image tags based on a confidence threshold. In some examples, a user provides the confidence threshold for filtering image tags.

Figure 5:
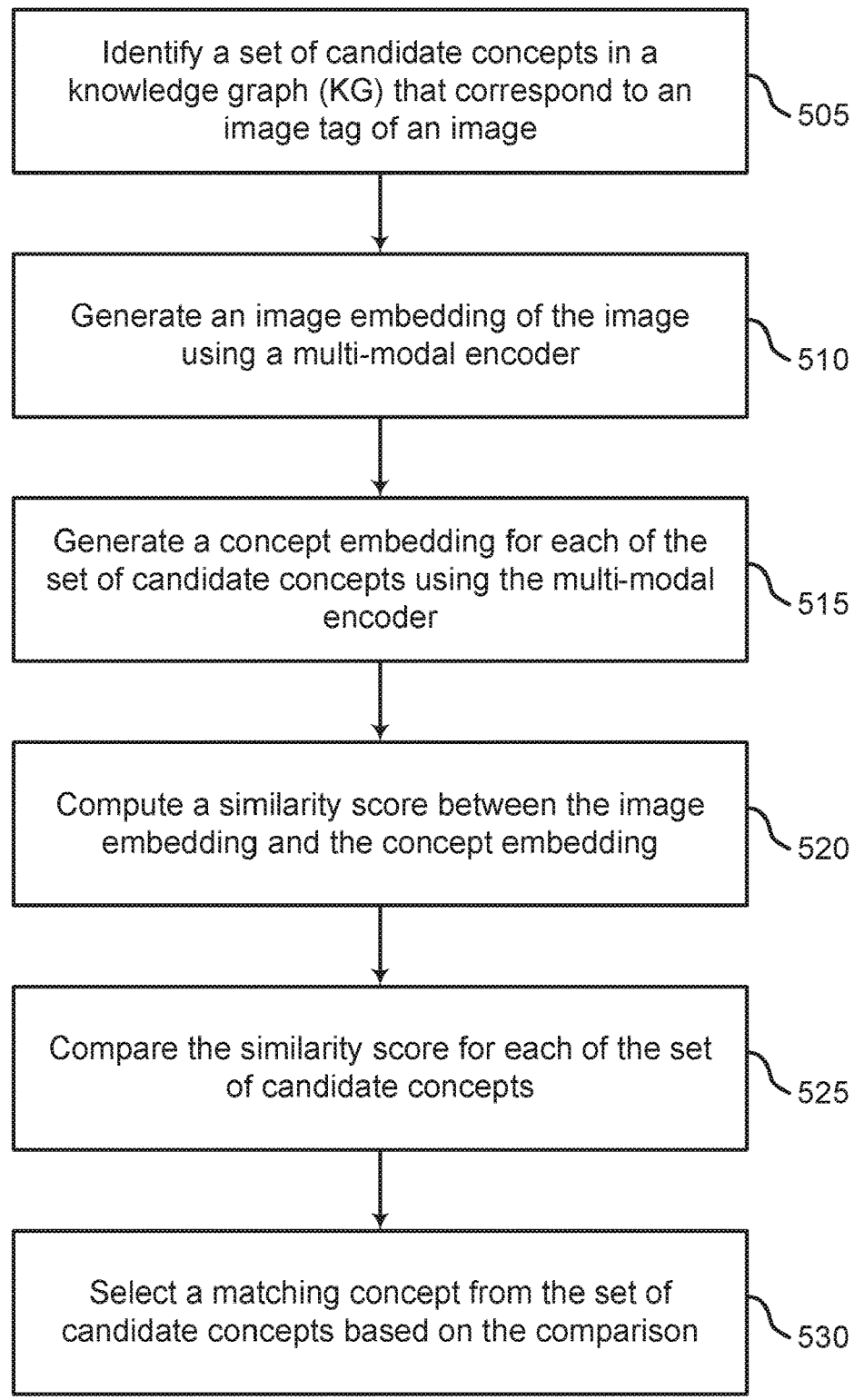
FIG. 5 shows an example of a method for comparing a similarity score for each of a set of candidate concepts according to aspects of the present disclosure.

FIG. 5 shows an example of a method for comparing a similarity score for each of a set of candidate concepts according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system identifies a set of candidate concepts in a knowledge graph (KG) that correspond to an image tag of an image. In some cases, the operations of this step refer to, or may be performed by, a knowledge graph component as described with reference to FIGS. 7-9. According to an embodiment, given a query image, an image tagger of the image processing apparatus (see FIG. 7) generates one or more tags based on the query image. The knowledge graph component of the system obtains a set of candidate concepts grounded in a knowledge graph. Each concept in the knowledge graph is associated with a concept description explaining the concept.

In some examples, the knowledge graph component identifies two candidate concepts in the knowledge graph that correspond to image tag "turkey". A first candidate concept is associated with concept description, "A Eurasian republic in Asian Minor and the Balkans". A second candidate concept is associated with concept description, "The turkey is a large bird in the Genus *Meleagris*, native to North America".

At operation 510, the system generates an image embedding of the image using a multi-modal encoder. In some cases, the operations of this step refer to, or may be performed by, a multi-modal encoder as described with reference to FIGS. 7-9.

At operation 515, the system generates a concept embedding for each of the set of candidate concepts using the multi-modal encoder. In some cases, the operations of this step refer to, or may be performed by, a multi-modal encoder as described with reference to FIGS. 7-9. According to an embodiment, the multi-modal encoder of the image processing apparatus extracts multi-modal text embeddings for each of the concept descriptions and can index the text embeddings into a datastore to perform nearest neighbor search.

At operation 520, the system computes a similarity score between the image embedding and the concept embedding. In some cases, the operations of this step refer to, or may be performed by, a matching component as described with reference to FIGS. 7 and 9.

According to an embodiment, the matching component of the image processing apparatus, via similarity search methods, are configured to locate a concept description (i.e., a matching concept) that are similar to the image based on comparing an image embedding of the query image to each textual embedding corresponding to a concept description identified in the knowledge graph. The image embedding and text embeddings corresponding to each concept description are in a same embedding space. In some examples, similarity can be quantified by using similarity metrics such as cosine similarity or L2 norm.

In some examples, the matching component computes a similarity score between the image embedding and a concept embedding corresponding to the first candidate concept. The matching component computes a similarity score between the image embedding and a concept embedding corresponding to the second candidate concept.

At operation 525, the system compares the similarity score for each of the set of candidate concepts. In some cases, the operations of this step refer to, or may be performed by, a matching component as described with reference to FIGS. 7 and 9. In some examples, the matching component compares the similarity score for the first candidate concept and the similarity score for the second candidate concept.

At operation 530, the system selects a matching concept from the set of candidate concepts based on the comparison. In some cases, the operations of this step refer to, or may be performed by, a matching component as described with reference to FIGS. 7 and 9. In some examples, the second candidate concept is associated with concept description, "The turkey is a large bird in the Genus *Meleagris*, native to North America". The system selects "The turkey is a large bird in the Genus *Meleagris*, native to North America" as a matching concept for image tag "turkey" because the similarity score for the second candidate concept is higher than the similarity score for the first candidate concept.

Network Architecture

In FIGS. 6-9, an apparatus and method for image processing are described. One or more embodiments of the apparatus and method include a knowledge graph (KG) component configured to identify a plurality of candidate concepts in a KG that correspond to an image tag of an image; a multi-modal encoder configured to generate an image embedding of the image, and to generate a concept embedding for each of the plurality of candidate concepts; and a matching component configured to select a matching concept from the plurality of candidate concepts based on the image embedding and the concept embedding.

Some examples of the apparatus and method further include an image tagger configured to extract a plurality of image tags based on the image, wherein the plurality of image tags comprises the image tag.

Some examples of the apparatus and method further include an association manager configured to generate association data between the image and the matching concept.

In some examples, the matching component computes a similarity score between the image embedding and the concept embedding, and compares the similarity score for each of the plurality of candidate concepts, wherein the matching concept is selected based on the comparison. In some examples, the similarity score comprises a cosine similarity score or a L2 norm. In some examples, the multi-modal encoder comprises a text-to-visual embedding model. In some examples, the multi-modal encoder comprises a Contrastive Language-Image Pre-Training (CLIP) model.

Figure 6:
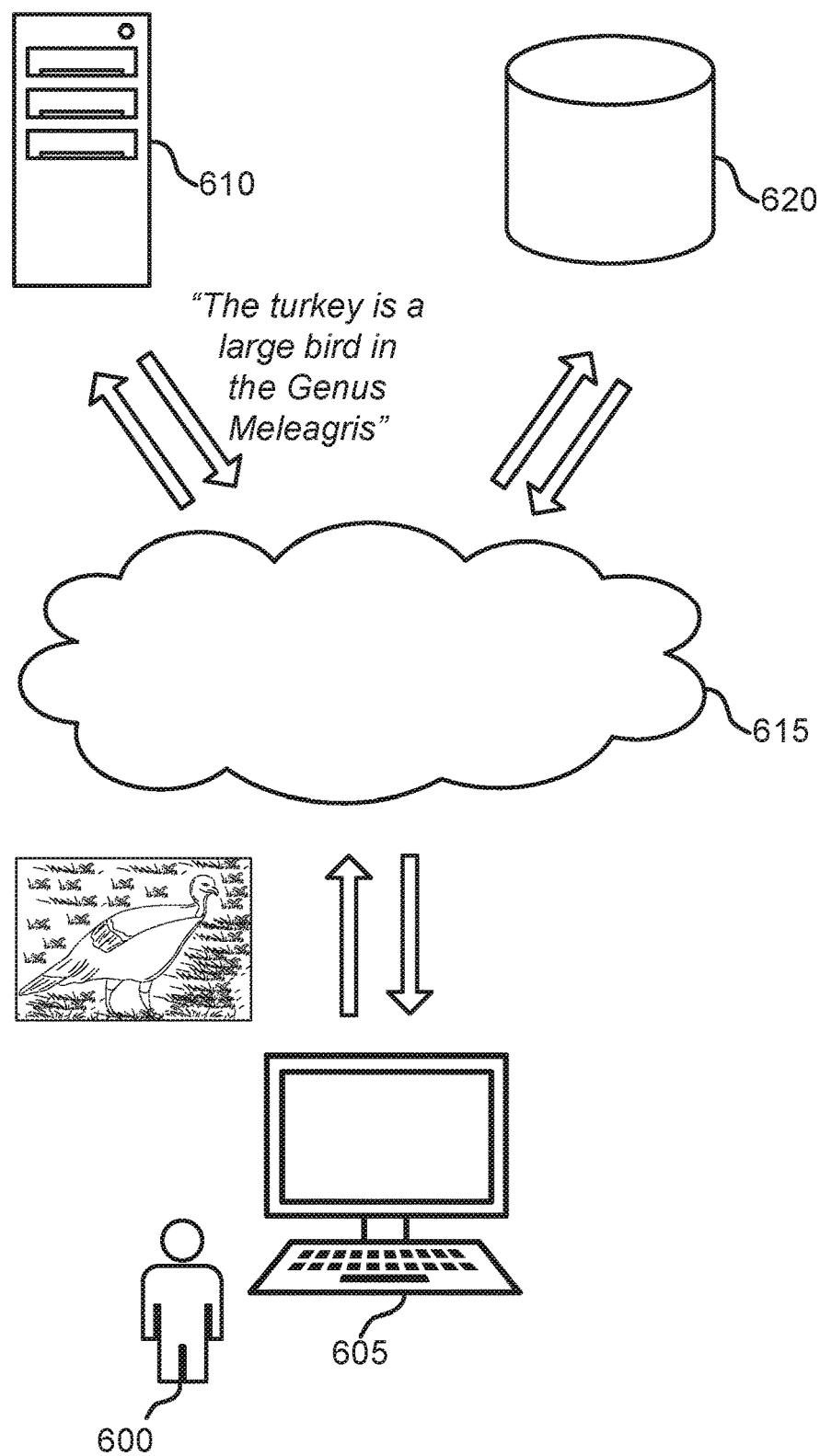
FIG. 6 shows an example of an image processing system according to aspects of the present disclosure.

FIG. 6 shows an example of an image processing system according to aspects of the present disclosure. The example shown includes user 600, user device 605, image processing apparatus 610, cloud 615, and database 620. Image processing apparatus 610 is an example of, or includes aspects of, the corresponding element described with reference to FIG. 7.

In an example of FIG. 6, user 600 provides a query image to image processing apparatus 610, e.g., via user device 605 and cloud 615. Image processing apparatus 610, via an image tagger, extracts an image tag based on the query image. In some examples, the image tag associated with the image is "turkey". However, the image tag is ambiguous because user 600 does not know whether tag "turkey" refers to turkey the bird or Turkey the country just by looking at the image tag.

Image processing apparatus 610 identifies candidate concepts in a knowledge graph (KG) that correspond to the image tag "turkey". In some examples, image processing apparatus 610 identifies two candidate concepts associated with respective concept description (i.e., where confusion with regards to the correct concept may arise), they are "A Eurasian republic in Asian Minor and the Balkans" and "The turkey is a large bird in the Genus *Meleagris*, native to North America".

A multi-modal encoder of image processing apparatus 610 generates an image embedding of the query image and a textual embedding (i.e., concept embedding) for each of the set of candidate concepts. The image embedding and the textual embeddings are in a same embedding space. Image processing apparatus 610 selects a matching concept from the set of candidate concepts based on the image embedding and the concept embeddings corresponding to the set of candidate concepts.

In some cases, image processing apparatus 610 returns the matching concept to user 600 via user device 605 and cloud 615. The matching concept is associated with a concept description, i.e., "The turkey is a large bird in the Genus *Meleagris*, native to North America". In some cases, image processing apparatus 610 generates association data between the image and the matching concept. This way, user 600 understands that the image tag "turkey" associated with the query image refers to turkey the bird, not the country.

User device 605 may be a personal computer, laptop computer, mainframe computer, palmtop computer, personal assistant, mobile device, or any other suitable processing apparatus. In some examples, user device 605 includes software that incorporates an image processing application (e.g., question answering application). In some examples, the image processing application on user device 605 may include functions of image processing apparatus 610.

A user interface may enable user 600 to interact with user device 605. In some examples, the user interface receives a query including the image. The user interface transmits the description in response to the query. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser. The user interface may be implemented on a mobile device of user 600 (e.g., cell phone).

Image processing apparatus 610 identifies a set of candidate concepts in a knowledge graph (KG) that correspond to an image tag of an image; generates an image embedding of the image using a multi-modal encoder; generates a concept embedding for each of the set of candidate concepts using the multi-modal encoder; selects a matching concept from the plurality of candidate concepts based on the image embedding and the concept embedding; and generates association data between the image and the matching concept. Image processing apparatus 610 returns the matching concept and respective concept description to user 600. An example application and process of using image processing apparatus 610 is further described with reference to FIG. 1.

Image processing apparatus 610 includes a computer implemented network comprising a knowledge graph component, a multi-modal encoder, a matching component, an image tagger, and an association manager. Image processing apparatus 610 may also include a processor unit, a memory unit, an I/O module, and a training component. The training component is used to train a machine learning model comprising a multi-modal encoder (e.g., a text-to-visual embedding model). In some cases, the machine learning model is also referred to as an image processing network. Additionally, image processing apparatus 610 can communicate with database 620 via cloud 615. In some cases, the architecture of the machine learning model is also referred to as a network or a network model. Further detail regarding the architecture of image processing apparatus 610 is provided with reference to FIGS. 7-9. Further detail regarding the operation of image processing apparatus 610 is provided with reference to FIGS. 1-5.

In some cases, image processing apparatus 610 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 615 is a computer network configured to provide on-demand availability of computer system resources, such as data storage and computing power. In some examples, cloud 615 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 615 is limited to a single organization. In other examples, cloud 615 is available to many organizations. In one example, cloud 615 includes a multi-layer communications network comprising multiple edge routers and core routers. In another example, cloud 615 is based on a local collection of switches in a single physical location.

Database 620 is an organized collection of data. For example, database 620 stores data in a specified format known as a schema. Database 620 may be structured as a single database, a distributed database, multiple distributed databases, or an emergency backup database. In some cases, a database controller may manage data storage and processing in database 620. In some cases, a user interacts with database controller. In other cases, database controller may operate automatically without user interaction.

Figure 7:
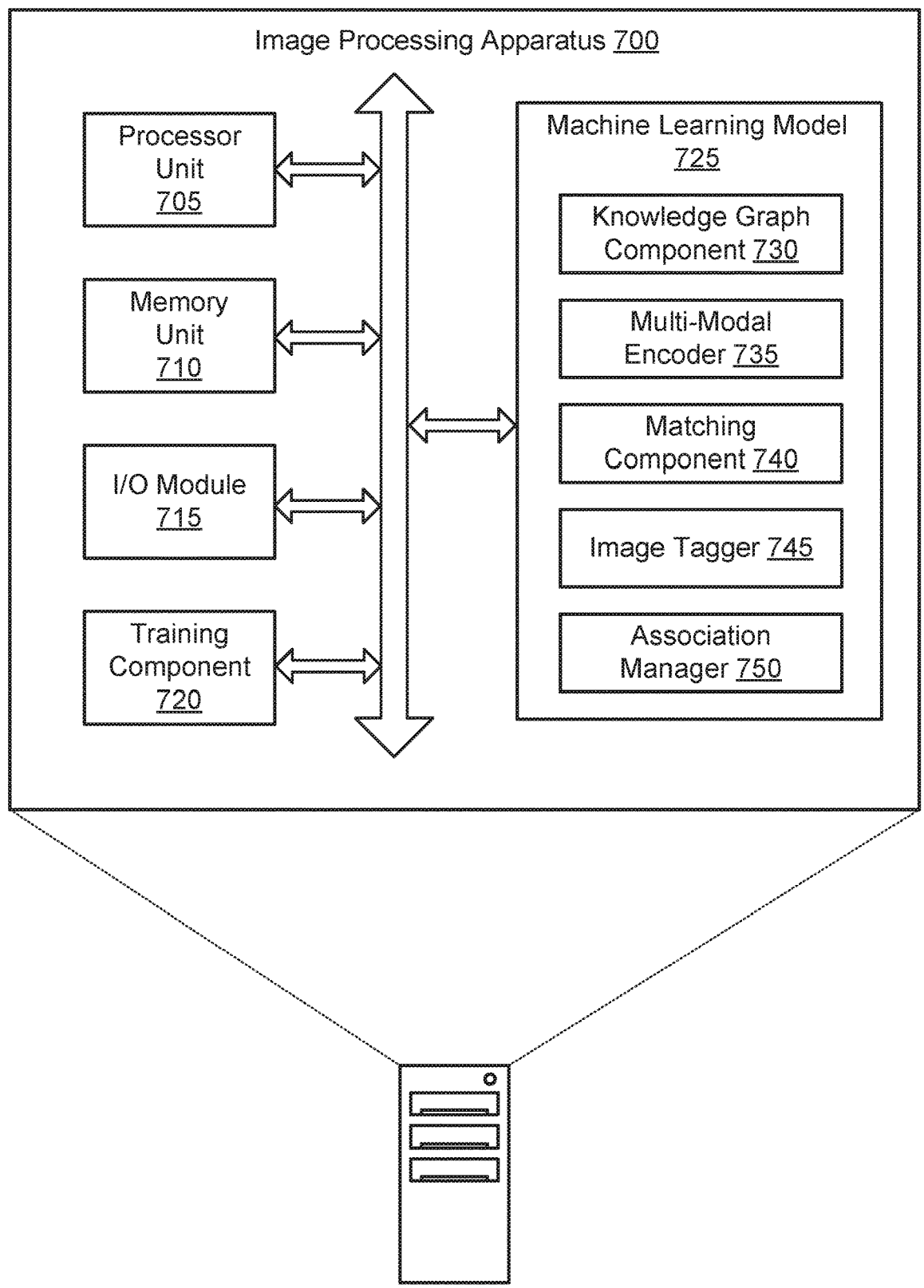
FIG. 7 shows an example of an image processing apparatus according to aspects of the present disclosure.

FIG. 7 shows an example of an image processing apparatus according to aspects of the present disclosure. The example shown includes image processing apparatus 700, processor unit 705, memory unit 710, I/O module 715, training component 720, and machine learning model 725. Image processing apparatus 700 is an example of, or includes aspects of, the corresponding element described with reference to FIG. 6. Machine learning model 725 is an example of, or includes aspects of, the corresponding element described with reference to FIG. 8. In one embodiment, machine learning model 725 includes knowledge graph component 730, multi-modal encoder 735, matching component 740, image tagger 745, and association manager 750.

Processor unit 705 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 705 is configured to operate a memory array using a memory controller. In other cases, a memory controller is integrated into the processor. In some cases, processor unit 705 is configured to execute computer-readable instructions stored in a memory to perform various functions. In some embodiments, processor unit 705 includes special purpose components for modem processing, baseband processing, digital signal processing, or transmission processing.

Examples of memory unit 710 include random access memory (RAM), read-only memory (ROM), or a hard disk. Examples of memory unit 710 include solid state memory and a hard disk drive. In some examples, memory unit 710 is used to store computer-readable, computer-executable software including instructions that, when executed, cause a processor to perform various functions described herein. In some cases, memory unit 710 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 710 store information in the form of a logical state.

I/O module 715 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 715 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 700 includes a computer implemented artificial neural network (ANN) for selecting a matching concept from a set of candidate concepts based on an image and a knowledge graph comprising nodes/concepts. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 700 includes a convolutional neural network (CNN) for image processing. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 720 receives a set of training images and a set of captions corresponding to each of the set of training images as input to multi-modal encoder 735. In some examples, training component 720 trains multi-modal encoder 735 based on the input using contrastive self-supervised learning. In some examples, training component 720 maximizes a similarity between an anchor image of the set of training images and a corresponding caption of the anchor image. Training component 720 minimizes a similarity between the anchor image of the set of training images and the set of captions excluding the corresponding caption. Training component 720 updates parameters of multi-modal encoder 735 based on the maximization and the minimization.

According to some embodiments, knowledge graph component 730 identifies a set of candidate concepts in a knowledge graph (KG) that correspond to an image tag of an image. In some examples, knowledge graph component 730 identifies a description for each of the set of candidate concepts, where the concept embedding is based on the description. In some examples, knowledge graph component 730 identifies a name for each of the set of candidate concepts in the KG. Knowledge graph component 730 determines that the name corresponds to the image tag. In some examples, knowledge graph component 730 identifies a description of the matching concept. Knowledge graph component 730 is an example of, or includes aspects of, the corresponding element described with reference to FIGS. 8 and 9.

According to some embodiments, multi-modal encoder 735 generates an image embedding of the image. In some examples, multi-modal encoder 735 generates a concept embedding for each of the set of candidate concepts. In some examples, multi-modal encoder 735 comprises a text-to-visual embedding model. In some examples, multi-modal encoder 735 includes a Contrastive Language-Image Pre-Training (CLIP) model. Multi-modal encoder 735 is an example of, or includes aspects of, the corresponding element described with reference to FIGS. 8 and 9.

In an embodiment, multi-modal encoder 735 (i.e., the text-to-visual embedding model) is trained using text-to-visual embedding techniques. In some examples, training component 720 generates query-based training data based on a text query used to initiate a search of digital images and a selection of a digital image from the search result. This way, association of the text query with the digital image may be determined for a multitude of digital images and text. The use of query-based training data may also be expanded through use of title-based training data as part of multi-task learning, which increases training accuracy by limiting noise in the query-based training data and supports use of long text sequences.

Training component 720 is configured to generate negative digital image samples that increase accuracy in training the text-to-visual embedding model. Training component 720 generates a negative digital image sample having a semantic and/or visual meaning that is similar to a positive digital image sample, but does not have the exact same components of the positive digital image sample.

In some examples, training component 720 selects the negative digital image sample from a subset of digital images that do not have at least one item of text, excluding stop words, also included with text associated with a positive digital image sample. In some examples, training component 720 selects the negative digital image sample from a subset of digital images that do not have each item of text, excluding stop words, also included with text associated with the positive digital image sample. This training data is then used to train a model supporting a single unified text-and-digital image embedding space that is configured to treat text and digital images as the same entity.

Training component 720 trains the text-to-visual embedding model based on a loss function. The loss function supports increased accuracy and computational efficiency over conventional loss functions by treating a loss calculated between a positive image embedding generated from a positive digital image sample and a text embedding calculated based on text associated with the positive digital image sample separately from a negative image embedding generated from a negative digital image sample and the text embedding. This permits a distance between the positive image embedding and the text embedding to reduce over time (during training) while a distance between the negative image embedding and the text embedding increases, thereby increasing model accuracy.

In an embodiment, training component 720 trains multi-modal encoder 735 (i.e., the text-to-visual embedding model) using a multi-modal metric loss function that tightens embedding clusters by pushing embeddings for dissimilar texts and digital images away from one another.

According to some embodiments, matching component 740 selects a matching concept from the set of candidate concepts based on the image embedding and the concept embedding. In some examples, matching component 740 computes a similarity score between the image embedding and the concept embedding. Matching component 740 compares the similarity score for each of the set of candidate concepts, where the matching concept is selected based on the comparison. In some examples, matching component 740 selects a matching concept from the set of candidate concepts based on the comparison. In some examples, the similarity score includes a cosine similarity score or a L2 norm. Matching component 740 is an example of, or includes aspects of, the corresponding element described with reference to FIG. 9.

According to some embodiments, image tagger 745 extracts a set of image tags based on the image, where the set of image tags includes the image tag. In some examples, image tagger 745 identifies a set of similar images based on the image embedding. Image tagger 745 identifies a set of additional image tags associated with the set of similar images. Image tagger 745 computes a tag similarity score for each of the set of additional image tags, where the image tag is selected based on the tag similarity score. Image tagger 745 is an example of, or includes aspects of, the corresponding element described with reference to FIGS. 8 and 9.

According to some embodiments, association manager 750 generates association data between the image and the matching concept. In some examples, association manager 750 identifies a set of images. Association manager 750 associates each of the set of images with a concept in the KG. Association manager 750 augments the KG with the set of images based on the association. Association manager 750 is an example of, or includes aspects of, the corresponding element described with reference to FIG. 9.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 8:
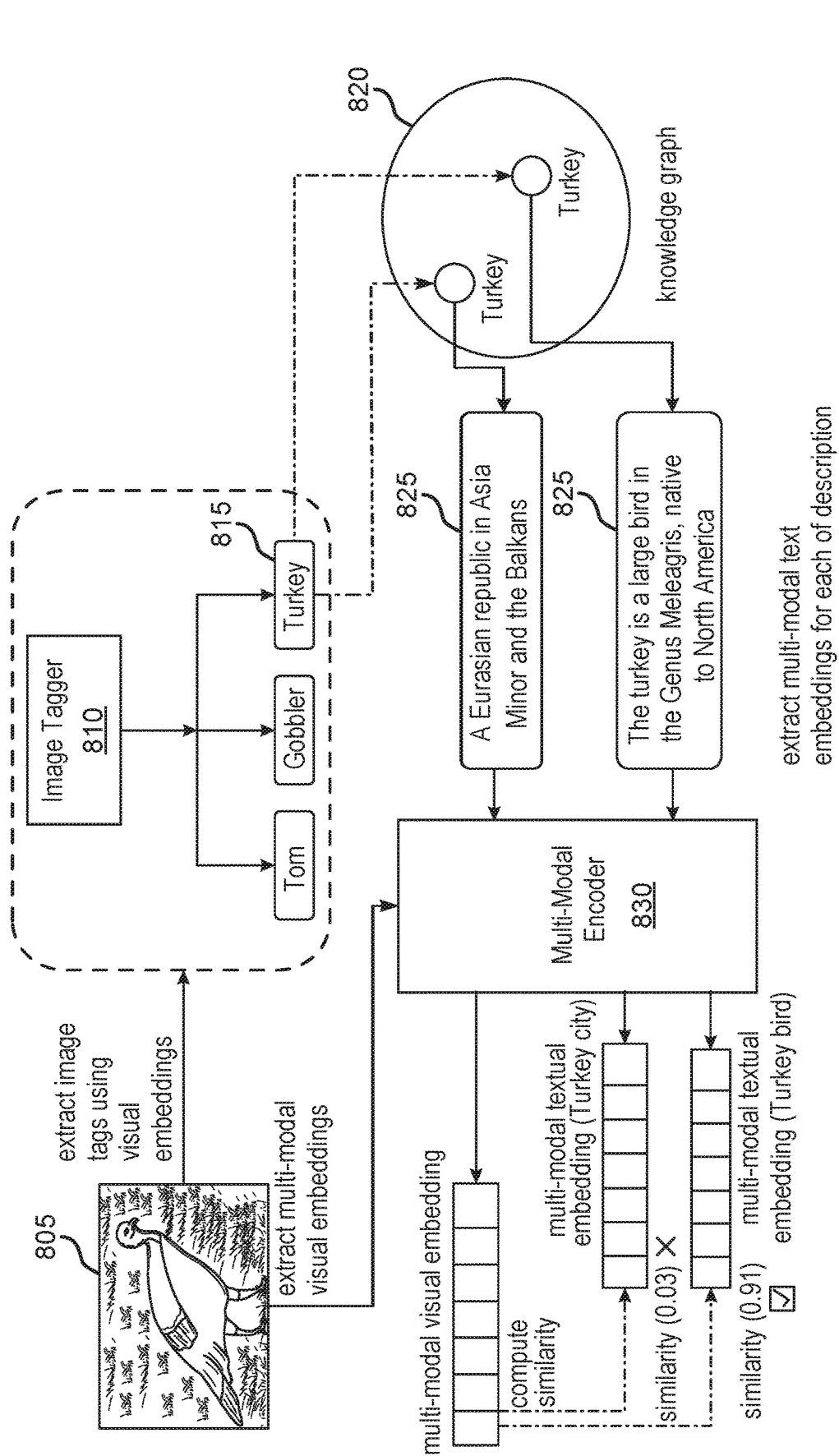
FIG. 8 shows an example of a machine learning model according to aspects of the present disclosure.

FIG. 8 shows an example of a machine learning model 800 according to aspects of the present disclosure. FIG. 8 shows machine learning model 800, which is a component of image processing apparatus 700 in FIG. 7. The example shown includes machine learning model 800, image 805, image tagger 810, image tag 815, knowledge graph component 820, concept description 825, and multi-modal encoder 830.

According to an embodiment, image tagger 810 generates one or more image tags based on image 805. Image tagger 810 is an example of, or includes aspects of, the corresponding element described with reference to FIGS. 7 and 9. In some examples, the one or more image tags include image tag 815 ("turkey"). It is not clear whether image tag "turkey" refers to turkey the bird or Turkey the country. Knowledge graph component 820 performs a lookup on the knowledge graph based on image tag 815 and determines whether or not there exists a concept that matches the generated image tag 815. If there is only one concept associated with the knowledge graph, then knowledge graph component 820 assigns the corresponding concept id in the knowledge graph with image tag 815. However, if there are multiple concepts for a single image tag. Then machine learning model 800 performs the following disambiguation step.

According to an embodiment, multi-modal encoder 830 extracts multi-modal visual embedding from image 805 (i.e., a query image). In some examples, the multi-modal visual embedding may be denoted as $MV_{emb}$. Machine learning model 800 can look up the candidate concepts from the knowledge graph that are ambiguous with image tag 815. For example, an image tag "turkey" from image tagger 810 is ambiguous. Hence, knowledge graph component 820 extracts all the corresponding concept descriptions from the knowledge graph for the name of concept (turkey). Knowledge graph component 820 is an example of, or includes aspects of, the corresponding element described with reference to FIGS. 7 and 9. In some examples, two concept descriptions from the knowledge graph are extracted based on the tag name "turkey". They are "A Eurasian republic in Asian Minor and the Balkans" and "The turkey is a large bird in the Genus *Meleagris*, native to North America".

In some cases, multi-modal encoder 830 extracts multi-modal text embedding (i.e., $MT_{emb}$) for each candidate description. The multi-modal visual embedding and text embeddings (i.e., $MV_{emb}$ and $MT_{emb}$) have same number of columns. The multi-modal visual embedding and text embeddings are in a same embedding space. Multi-modal encoder 830 is an example of, or includes aspects of, the corresponding element described with reference to FIGS. 7 and 9.

According to an embodiment, a matching component of machine learning model 800 computes a similarity score between $MV_{emb}$ and $MT_{emb}$. In some examples, the similarity metric is cosine distance or L2 distance formulated as follows:

$$Sim_i = dist(MV_{emb}, MT_{emb}^i) \qquad (3)$$

Based on the similarity score, the matching component of machine learning model 800 selects the closest concept description that is most similar to the multi-modal visual embedding. As an example shown in FIG. 8, a similarity score between the visual embedding and textual embedding for concept description "Turkey city" is 0.03. A similarity score between the visual embedding and textual embedding for concept description "turkey bird" is 0.91. Accordingly, the matching component compares the similarity score corresponding to each of the set of candidate concepts. The matching component selects a matching concept from the set of candidate concepts based on the comparison. In the above example, the matching component of machine learning model 800 selects the concept description, i.e., "The turkey is a large bird in the Genus *Meleagris*, native to North America", whose textual embedding is most similar to the multi-modal visual embedding of image 805. Machine learning model 800 is an example of, or includes aspects of, the corresponding element described with reference to FIG. 7.

Image 805 is an example of, or includes aspects of, the corresponding element described with reference to FIG. 2. Image tag 815 is an example of, or includes aspects of, the corresponding element described with reference to FIG. 2.

Concept description 825 is an example of, or includes aspects of, the corresponding element described with reference to FIG. 2.

Figure 9:
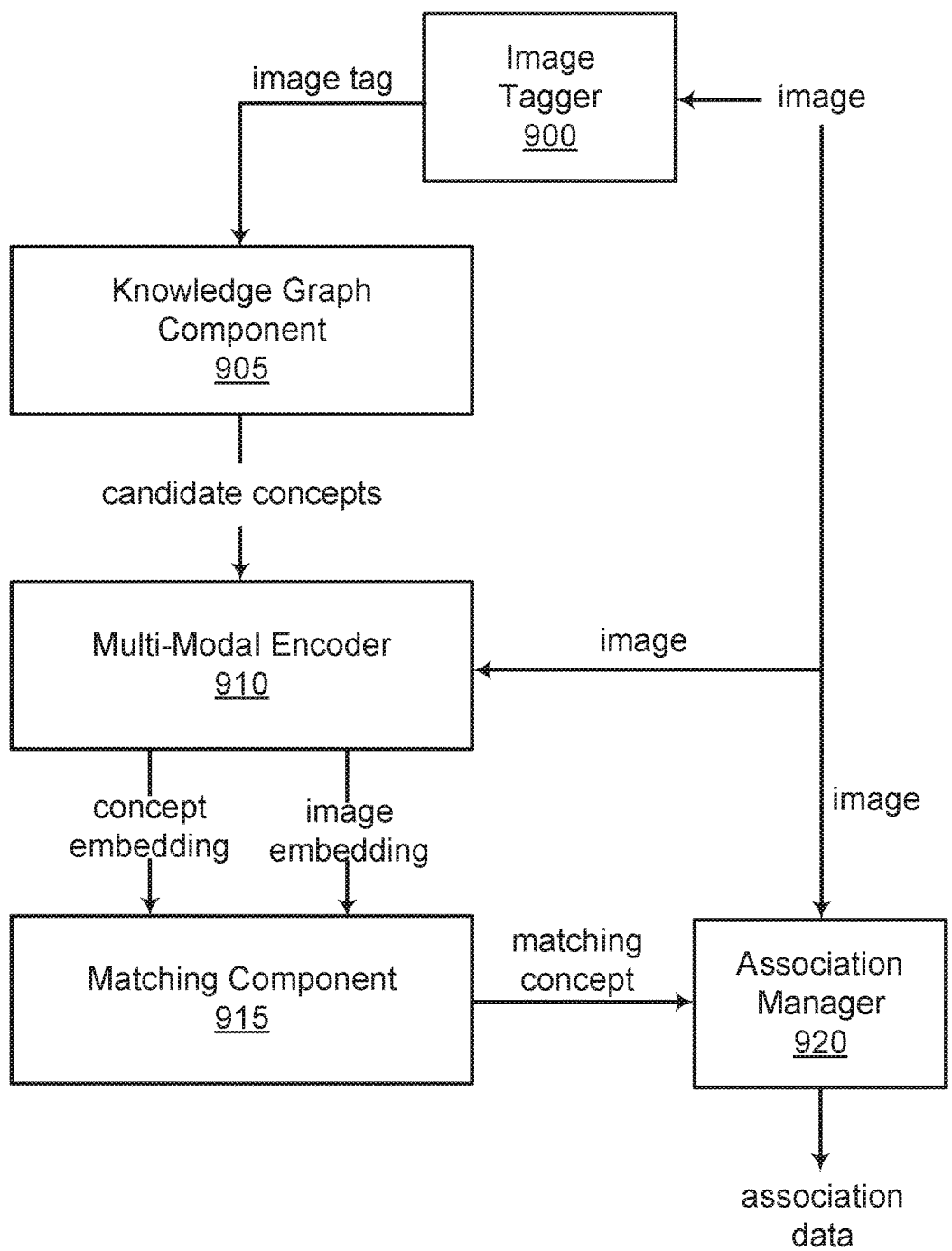
FIG. 9 shows an example of an image processing diagram according to aspects of the present disclosure.

FIG. 9 shows an example of an image processing diagram according to aspects of the present disclosure. FIG. 9 illustrates components of machine learning model 725 as in FIG. 7. The example shown includes image tagger 900, knowledge graph component 905, multi-modal encoder 910, matching component 915, and association manager 920.

According to an example illustrated by FIG. 9, a query image is input to image tagger 900 to generate one or more image tags. For example, an image depicting a turkey the bird may be associated with image tags such as Tom, gobbler, and turkey. It is not clear whether tag "turkey" refers to turkey the bird or Turkey the country. Image tagger 900 is an example of, or includes aspects of, the corresponding element described with reference to FIGS. 7 and 8.

According to an embodiment, the image tag is input to knowledge graph component 905. Knowledge graph component 905 extracts a set of candidate concepts from a knowledge graph based on the image tag. In the above example, the set of candidate concepts (their concept descriptions) are "A Eurasian republic in Asian Minor and the Balkans" and "The turkey is a large bird in the Genus *Meleagris*, native to North America". Knowledge graph component 905 is an example of, or includes aspects of, the corresponding element described with reference to FIGS. 7 and 8.

According to an embodiment, the query image is input to multi-modal encoder 910 to generate an image embedding corresponding to the query image. Image embedding may also be referred to as multi-modal image embedding. Multi-modal encoder 910 generates a concept embedding for each of the plurality of candidate concepts. In some cases, the concept embedding may also be referred to as multi-modal textual embedding. Multi-modal encoder 910 is an example of, or includes aspects of, the corresponding element described with reference to FIGS. 7 and 8. Detail regarding the architecture and training of multi-modal encoder 910 is described in FIGS. 7 and 10.

According to an embodiment, matching component 915 computes a similarity score between the image embedding and the concept embedding. Matching component 915 compares the similarity score for each of the plurality of candidate concepts and selects a matching concept from the set of candidate concepts based on the comparison. In the above example, matching component 915 selects "The turkey is a large bird in the Genus *Meleagris*, native to North America" as the appropriate concept description for image tag "turkey". Matching component 915 is an example of, or includes aspects of, the corresponding element described with reference to FIG. 7.

According to an embodiment, the query image and the matching concept are input to association manager 920. Association manager 920 generates association data between the image and the matching concept. In some examples, association manager 920 identifies a set of images, associates each of the set of images with a concept in the knowledge graph, and augments the knowledge graph with the set of images based on the association. Association manager 920 is an example of, or includes aspects of, the corresponding element described with reference to FIG. 7.

Training

Figure 10:
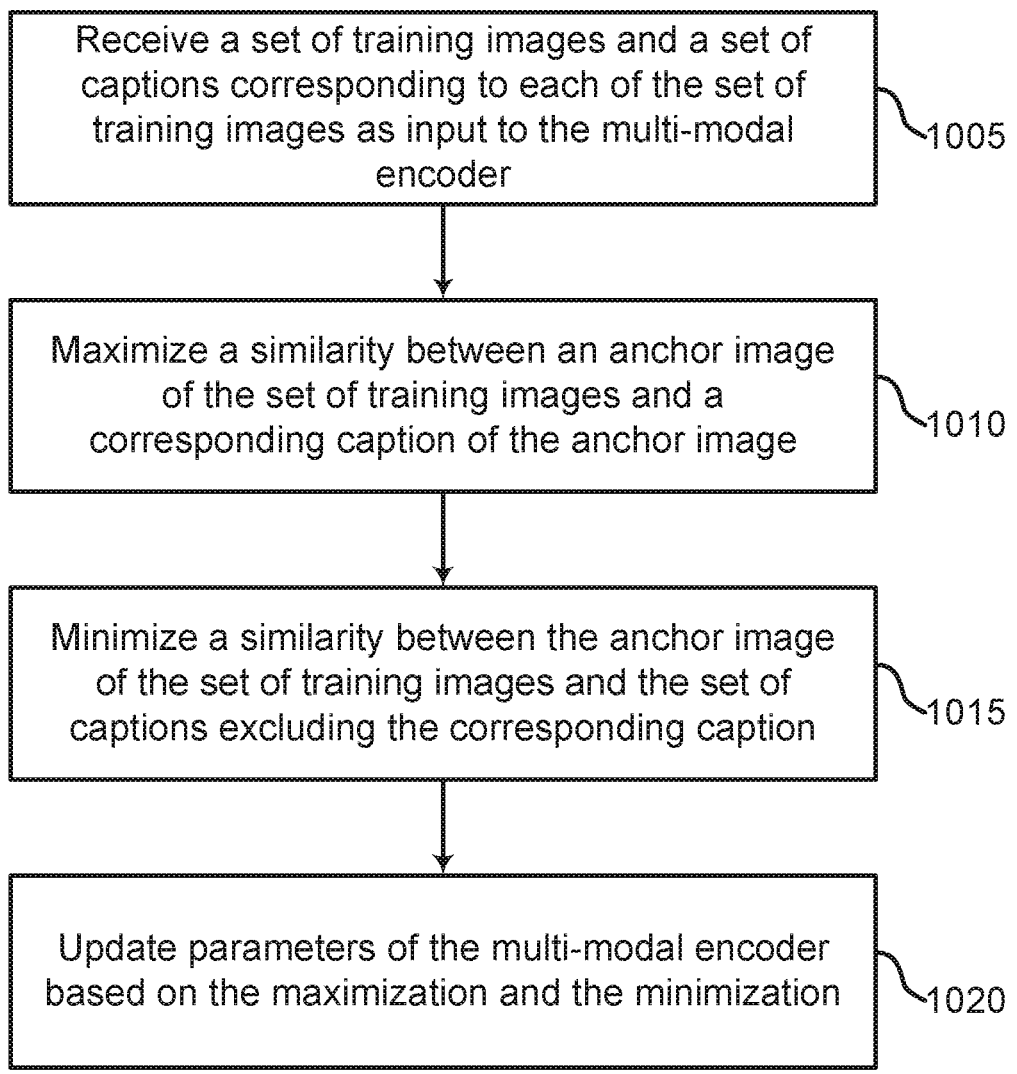
FIG. 10 shows an example of a method for training a multi-modal encoder according to aspects of the present disclosure.

FIG. 10 shows an example of a method for training a multi-modal encoder according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some embodiments, multi-modal encoder 735 of the image processing apparatus (see FIG. 7) is trained using contrastive self-supervised learning. Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs. In self-supervised examples, positive samples can be generated automatically from input data (e.g., by cropping or transforming an existing image).

In some examples, a loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

At operation 1005, the system receives a set of training images and a set of captions corresponding to each of the set of training images as input to the multi-modal encoder. In some cases, the operations of this step refer to, or may be performed by, a training component as described with reference to FIG. 7.

At operation 1010, the system maximizes a similarity between an anchor image of the set of training images and a corresponding caption of the anchor image. In some cases, the operations of this step refer to, or may be performed by, a training component as described with reference to FIG. 7.

At operation 1015, the system minimizes a similarity between the anchor image of the set of training images and the set of captions excluding the corresponding caption. In some cases, the operations of this step refer to, or may be performed by, a training component as described with reference to FIG. 7. In some embodiments, a multi-modal encoder is trained that takes an image and a corresponding caption of the image as input. Additionally, the multi-modal model maximizes the similarity between the same image and the corresponding caption in the batch while reducing the similarity between the anchor image and the rest of the captions in the mini batch.

At operation 1020, the system updates parameters of the multi-modal encoder based on the maximization and the minimization. In some cases, the operations of this step refer to, or may be performed by, a training component as described with reference to FIG. 7. In some embodiments, the process is repeated for anchor caption and rest of all the images in the mini batch. The multi-modal encoder is trained for multiple epochs. The multi-modal encoder is configured to bring image embeddings and caption embeddings to a shared embedding space where caption embeddings are used to retrieve similar images and vice versa. In some cases, images can also be used to retrieve similar captions.

In an embodiment, training component 720 (see FIG. 7) is configured to generate negative digital image samples that increase accuracy in training the text-to-visual embedding model. Training component 720 generates a negative digital image sample having a semantic and/or visual meaning that is similar to a positive digital image sample, but does not have the exact same components of the positive digital image sample.

In some examples, training component 720 selects the negative digital image sample from a subset of digital images that do not have at least one item of text, excluding stop words, also included with text associated with a positive digital image sample. In some examples, training component 720 selects the negative digital image sample from a subset of digital images that do not have each item of text, excluding stop words, also included with text associated with the positive digital image sample. This training data is then used to train a model supporting a single unified text-and-digital image embedding space that is configured to treat text and digital images as the same entity.

Performance of apparatus, systems and methods of the present disclosure have been evaluated, and results indicate embodiments of the present disclosure have obtained increased performance over existing technology. Example experiments demonstrate that the image processing apparatus outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
    identifying a plurality of candidate concepts in a knowledge graph (KG) that correspond to an image tag of an image, wherein the knowledge graph comprises a plurality of nodes corresponding to the plurality of candidate concepts;
    generating an image embedding of the image using a multi-modal encoder;
    generating a text embedding for each of the plurality of candidate concepts using the multi-modal encoder used to generate the image embedding, wherein the image embedding and the text embedding are located in a same embedding space;
    selecting a matching concept from the plurality of candidate concepts based on the image embedding and the text embedding;
    generating association data between the image and the matching concept; and
    transmitting information from the knowledge graph corresponding to the image based on the association data between the image and the matching concept.

2. The method of claim 1, further comprising:
    extracting a plurality of image tags based on the image using an image tagger neural network, wherein the plurality of image tags comprises the image tag.

3. The method of claim 2, further comprising:
    identifying a plurality of similar images based on the image embedding;
    identifying a plurality of additional image tags associated with the plurality of similar images; and
    computing a tag similarity score for each of the plurality of additional image tags, wherein the image tag is selected based on the tag similarity score.

4. The method of claim 1, further comprising:
    identifying a description from the KG for each of the plurality of candidate concepts; and
    applying the multi-modal encoder to the description, wherein the text embedding is based on the description.

5. The method of claim 1, further comprising:
    identifying a name for each of the plurality of candidate concepts in the KG; and
    determining that the name corresponds to the image tag, wherein the plurality of candidate concepts are identified based on the determination.

6. The method of claim 1, further comprising:
    computing a similarity score between the image embedding and the text embedding; and
    comparing the similarity score of each of the plurality of candidate concepts, wherein the matching concept is selected based on the comparison.

7. The method of claim 1, further comprising:
    identifying a plurality of images;
    associating each of the plurality of images with a concept in the KG; and
    augmenting the KG with the plurality of images based on the association.

8. The method of claim 1, further comprising:
    receiving a query including the image;
    identifying a description of the matching concept; and
    transmitting the description in response to the query.

9. The method of claim 1, further comprising:
    receiving a plurality of training images and a plurality of captions corresponding to each of the plurality of training images as input to the multi-modal encoder; and
    training the multi-modal encoder based on the input using contrastive self-supervised learning.

10. The method of claim 9, further comprising:
    maximizing a similarity between an anchor image of the plurality of training images and a corresponding caption of the anchor image;
    minimizing a similarity between the anchor image of the plurality of training images and the plurality of captions excluding the corresponding caption; and
    updating parameters of the multi-modal encoder based on the maximization and the minimization.

11. A method for image processing, comprising:
    identifying a plurality of candidate concepts in a knowledge graph (KG) that correspond to an image tag of an image, wherein the knowledge graph comprises a plurality of nodes corresponding to the plurality of candidate concepts;
generating an image embedding of the image using a multi-modal encoder;
generating a text embedding for each of the plurality of candidate concepts using the multi-modal encoder used to generate the image embedding, wherein the image embedding and the text embedding are located in a same embedding space;
computing a similarity score between the image embedding and the text embedding;
comparing the similarity score for each of the plurality of candidate concepts; and
selecting a matching concept from the plurality of candidate concepts based on the comparison.

12. The method of claim 11, further comprising:
extracting a plurality of image tags based on the image using an image tagger, wherein the plurality of image tags comprises the image tag.

13. The method of claim 11, further comprising:
identifying a description for each of the plurality of candidate concepts, wherein the text embedding is based on the description.

14. The method of claim 11, further comprising:
identifying a name for each of the plurality of candidate concepts in the KG; and
determining that the name corresponds to the image tag.

15. An apparatus for image processing, comprising:
a knowledge graph (KG) component configured to identify a plurality of candidate concepts in a knowledge graph that correspond to an image tag of an image, wherein the knowledge graph comprises a plurality of nodes corresponding to the plurality of candidate concepts;
a multi-modal encoder configured to generate an image embedding of the image, and to generate a text embedding for each of the plurality of candidate concepts, wherein the image embedding and the text embedding are located in a same embedding space; and
a matching component configured to select a matching concept from the plurality of candidate concepts based on the image embedding and the text embedding.

16. The apparatus of claim 15, further comprising:
an image tagger configured to extract a plurality of image tags based on the image, wherein the plurality of image tags comprises the image tag.

17. The apparatus of claim 15, further comprising:
an association manager configured to generate association data between the image and the matching concept.

18. The apparatus of claim 15, wherein:
the matching component computes a similarity score between the image embedding and the text embedding, and compares the similarity score for each of the plurality of candidate concepts, wherein the matching concept is selected based on the comparison.

19. The apparatus of claim 18, wherein:
the similarity score comprises a cosine similarity score or a L2 norm.

20. The apparatus of claim 15, wherein:
the multi-modal encoder comprises a text-to-visual embedding model.

* * * * *